Patented Aug. 18, 1931

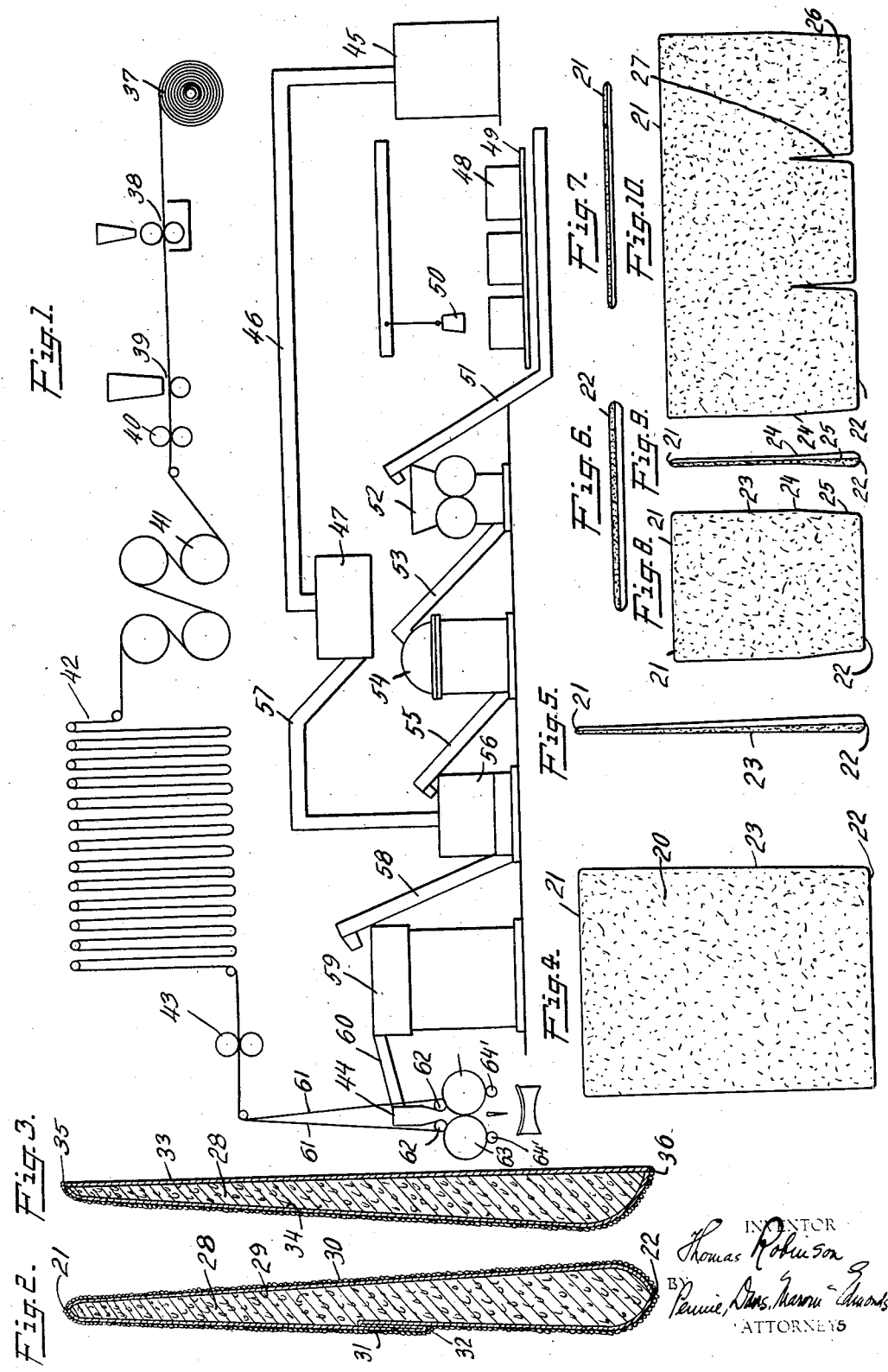

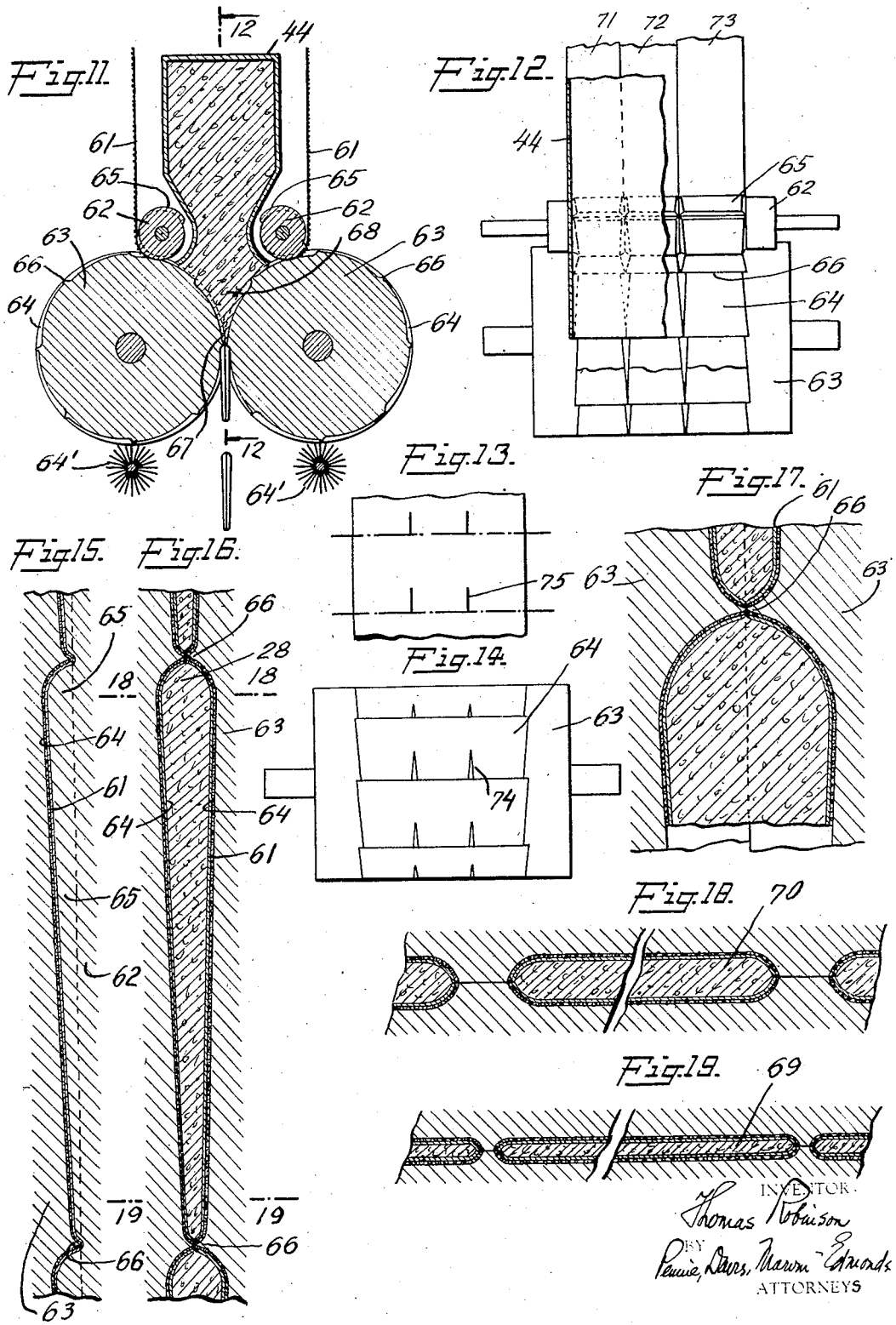

1,819,200

UNITED STATES PATENT OFFICE

THOMAS ROBINSON, OF NEW YORK, N. Y., ASSIGNOR TO LANCASTER ASPHALT, INC.

APPARATUS FOR MAKING BUILDING MATERIAL

Original application filed October 5, 1926, Serial No. 139,612. Divided and this application filed September 12, 1927. Serial No. 219,011.

This invention relates to the manufacture of building materials and is concerned more particularly with improved apparatus by which a novel product may be made in forms and shapes suitable for use as roofing, siding, and the like. This new product, while capable of advantageous use in many ways, is probably of greatest utility for roofing purposes, replacing shingles of wood or so-called "prepared roofing" of impregnated felt, asbestos products, and other similar materials. Accordingly, for purposes of illustration and description the product produced by the novel apparatus will be referred to hereafter as roofing and different forms of the product especially adapted for that purpose and apparatus for making such products will be set forth in detail, though it is to be understood that the utility of the novel apparatus is not limited to any particular product and its adaptation to the manufacture of roofing is merely typical of its wide application.

Prepared roofing now enjoying the greatest favor consists of a felted sheet base saturated and coated with asphalt and commonly provided with a wear surface of granular material, such as crushed slate. This roofing material is cheaper and more resistant to fire than ordinary wood shingles, but the felt ordinarily used in its production is quite expensive and shingles made from such roofing material are quite thin, so that the roof covered with these shingles does not have the attractive appearance resulting from the use of shingles having thick butts which cast a considerable shadow.

The apparatus of the present invention is arranged for the production of roofing products which differ from those heretofore manufactured in that the major portion of the new product is made of a hardened plastic material which is provided with a protective jacket which covers both faces of the mass or core of plastic material and preferably extends over its side and end edges, thus reinforcing and protecting the core and preventing extrusion of the core material at the edges of the shingle when the latter is subjected to pressure. The jacket on the core may be sealed by the application of a sealing layer and wear material of a suitable type may also be affixed.

The material which is produced by the use of the novel apparatus may include substances for the core in wide variety. I prefer to employ a bituminous material such as asphalt as a binder in the core and with this mix finely divided solid material, such as crushed mineral, sand, fine rock, and the like. Instead of a mineral matter, which gives the product considerable weight, it may be desirable in some instances to substitute therefor saw dust, asbestos sand, fibrous asbestos, granulated cork, infusorial earth, or mixtures of the various substances mentioned. Also instead of using a bituminous binder, cementitious materials of different kinds may be employed, these materials being selected so that the mixture of binder and solid material will upon setting form a compact substantially rigid body. Asphalt is highly satisfactory for the purpose because of its cheapness and easy working qualities and because a product made from it may be readily cut or pierced by nails. The binder of course should be one which is not detrimentally affected by the weather and if asphalt is used, it should be capable of withstanding solar heat.

The jacket used is preferably a flexible, fibrous sheet of relatively light weight, such for example, as a heavy coarse paper, either impregnated with water-resistant material or not, as may be desired. Asphalt-impregnated paper is easily handled and serves the purpose satisfactorily.

The new apparatus includes mechanism for preparing and mixing the core material and placing it in a form suitable for the manufacture of the new product, and also includes means for treating the jacket material and putting it in condition to be combined with the plastic core substance. For the actual manufacture of the product the apparatus includes pressure devices, preferably in the form of rotary molding drums of appropriate form between which pass a pair of jacket sheets with core material between them, the drums acting on the jacket and plastic mass to produce individual elements, each of which is complete in itself.

For a better understanding of the invention, reference may be had to the accompanying drawings, in which Fig. 1 shows largely diagrammatically a layout of the complete apparatus, Figs. 2 and 3 are longitudinal sections on an enlarged scale of different forms of the product produced in this apparatus, Fig. 4 is a face view of a single roofing element, Fig. 5 is a side edge view of the same, Figs. 6 and 7 are end views at the thick and thin ends respectively of the element illustrated in Fig. 5, Figs. 8 and 9 are face and side edge views respectively of a modified form of product, Fig. 10 is a face view of a multiple unit shingle, Fig. 11 is a view in vertical section through a part of the apparatus, Fig. 12 is a sectional view on the line 12—12 of Fig. 11, Fig. 13 is a fragmentary view of one of the webs at one stage in the manufacture of the product illustrated in Fig. 10, Fig. 14 is a face view of one of the molding drums, Fig. 15 is a sectional development view of a pair of rolls used in the manufacture of the new element, Fig. 16 is a sectional view of a development of a portion of the molding drums, Fig. 17 is a fragmentary view of certain parts illustrated in Fig. 16, but on a larger scale, Fig. 18 is a sectional view on the line 18—18 of Fig. 16, and Fig. 19 is a similar view on the line 19—19 of Fig. 16.

Referring now to the drawings, a product such as may be produced by the new apparatus is illustrated in Fig. 4 in the form of a single roofing element or shingle. This shingle 20 is generally of rectangular shape but of tapering section, with its thickness increasing from one end 21 to the opposite or butt end 22. Similarly the side edges 23 of the element converge from the end 21 to the end 22.

In Fig. 8 there is shown a somewhat modified form of product in which the major portion of the element is of uniform thickness from the end 21 to the point 24 at which the thickness begins to increase, until the end 22 is reached. In this element the side edges 23 lie parallel to the point 24 and then converge, as at 25.

In Fig. 10 there is shown a multi-unit shingle of the three-unit size having tabs 26 defined along one edge by notches 27. This element may be produced either with a tapered thickness from the edge 21 to the butt edge 22, or else, as illustrated, the thickness may be uniform from the edge 21 to the point 24, with the tabs of increasing thickness. Preferably the point 24 is located nearer the end 21 than the line defining the normally exposed portion of the shingle.

The new product may be made in various forms, two of which are illustrated in Figs. 2 and 3. In Fig. 2 the product is shown as consisting of a mass of core material 28 with jackets 29 applied to either face. The element illustrated in this figure is of tapering thickness from the end 21 to the end 22 and the jackets meet at their extreme end edges. The outer surfaces of the core material curve toward each other so that the meeting edges of the jacket lie between the planes of the two faces of the element and the curvature is such that the section of the element at each edge is similar to that of a pointed arch. In the element shown in Fig. 2, each jacket sheet 29 has been coated with a sealing material, and in this is embedded a layer of granular wear material 30. One of the jackets has been folded upon itself as at 31 to form a shoulder 32, this shoulder lying substantially along one side of the normally exposed area of the shingle so that when these shingles are laid in overlapping courses, the shingles of the upper course rest upon the shoulders of the shingles of the lower course. Thus the upper course shingles are somewhat raised from the lower course shingles and cast an exaggerated shadow which gives the effect of increased thickness at the butt. Instead of employing a web which has a fold for one face of the shingle, a pair of plain webs similar to that designated 29 may be used, if desired.

In the product illustrated in Fig. 3, one jacket 33 is shown as plane, while the other jacket 34 is of curving section. The ends of the jackets meet at 35 and 36 in the plane of the jacket 33 and the jacket 34 is curved with reference to the jacket 31 so that the element has one flat face, while its thickness increases from one end to the other. The jacket 33 may be provided with a sealing coat and a wear surface, or may be left plain, and the jacket 34 may similarly be treated. As illustrated, the jacket 34 is provided with a sealing coating and a layer of granular wear material.

The apparatus by which these new products are made is illustrated diagrammatically in Fig. 1. This apparatus includes means for preparing the webs and the core material and combining these materials to form the finished product. The supply of jacket material is illustrated as taking the form of a roll 37 on which two webs of jacket material are wound about a single core. If desired, two separate rolls of jacket material, however, may be employed. The two jacket webs drawn from the supply roll 37 are first led through coating rolls 38, where the outer faces of the webs receive an application of coating material, such as asphalt of a suitable melting point. The coating mechanism may be of any convenient form and that ordinarily used in the roofing industry is satisfactory for the purpose.

Passing from the coating apparatus, the coated webs are next led to mechanism designated 39 by which wear material is applied to one or both jackets on their outer surfaces. This wear material may be of any suitable product such as crushed slate or the like, and after being discharged upon the sealing coating, the granular material is partially embedded therein by means of pressure rolls 40. The devices designated 39 and 40 are of commonly-known construction and require no further explanation. From the embedding rolls 40 the webs pass around cooling drums 41 and are then led through an air cooling device 42, through which the webs move in the form of festoons and with a slow travel. From the cooling device, which hardens and sets the coating, the webs pass through cutting devices 43 which may in some instances be dispensed with. These devices may be used for trimming the edges of the webs and subdividing the latter, in the event that the webs are wider than required for a single element. The webs next pass one on each side of a receptacle 44 containing the plastic core material.

This core material may be of any suitable composition previously described, and the apparatus used will to some extent depend on the material making up the core. When asphalt is used as a binder and combined with a mineral aggregate, the apparatus illustrated may conveniently be employed. This apparatus includes a supply bin 45 for the granular material which is delivered therefrom by a conveyor 46 to a heating device 47, the temperature of the granular material being raised therein so that it may mix readily with the asphalt. The asphalt is received in metal drums which are stripped from the solid asphalt masses, and these masses 48 are then placed on a grille 49 and broken up by means of a crushing device 50. The grille is of appropriate form so that the chunks of asphalt are broken to relatively fine size before passing through the grille and being delivered to a conveyor 51 which conveys them to a crusher 52. The crushed asphalt particles are taken from the crusher by a conveyor 53 and delivered to a pulverizer 54 which grinds the particles to the desired fine condition. This ground material is then carried by a conveyor 55 to a measuring apparatus 56 to which the heated granular substance is similarly delivered from the heating device 47 by a conveyor 57. The measuring apparatus 56 is standard commercial equipment and delivers measured quantities of asphalt and granular material by means of a conveyor 58 to the mixing apparatus 59. This apparatus is power driven and produces a thorough mixture and agitation of the two substances. The mixer is preferably steam heated so that the solid material and the asphalt form a homogeneous plastic mass which is delivered by a conveyor 60 to the receptacle 44.

The two webs 61 of jacket material pass on opposite sides of the receptacle 44 and then around rolls 62 (Fig. 11). Each of these rolls lies with its surface in contact with the surface of a molding drum 63 and the receptacle 44 has an open bottom so that its contents flow therefrom into the bight of the two molding drums. Each of these drums has a plurality of mold cavities 64 in its face and in some instances the rolls 62 may be provided with projections 65 corresponding in contour with the cavities 64 and cooperating therewith to force the webs 61 into these cavities. The cavities on the two drums are arranged to cooperate in pairs and as the drums rotate the cavities move into registry and the drums apply pressure to the plastic mass and the webs which lie in the bottoms of the cavities. Each cavity may be defined wholly or in part by a cutting edge 66 so that as the cutting edges come together the webs are severed around the outlines of the cavities. Brushes 64' may be provided for cleaning the cavities before the webs are forced into them.

For a clear understanding of the use of the molding cylinders, reference may be had to Fig. 16, showing a development of a portion of these cylinders. Each cylinder 63 is shown in this view as having a single cavity 64 against the bottom of which lie the webs 61. Between the webs is the plastic filling material 28, and owing to the pressure exerted upon the material in the rotation of the drums, the material has entirely filled the two cavities and the webs have been pinched and severed between the cutting edges 66.

In the operation of the device the thin edges of the tapering elements are produced first, that is, the advancing ends of the cavities are shallower than the trailing ends. The plastic material flowing from the receptacle 44 enters the space between the two cylinders and as the cylinders rotate, enough material is seized between the cooperating concave surfaces of the cylinders to completely fill the cavity defined by these surfaces, the excess material being forced upwardly into the receptacle. That material which lies at the point 67 (Fig. 11) is pinched between the two cylinders and is not free to move upwardly to any extent, whereas the material at the point 68 can move upwardly as the cylinders advance. The consequence of this arrangement is that a greater pressure is applied to the plastic material occupying the thin end of the element and this material is therefore compacted to a greater extent and made more dense. The material in the thicker end of the element, while sufficient in amount to give the element the desired shape, is not subjected to a pressure as great as that exerted on the material in the thin end and therefore the core in the thick end is less compacted and dense. In the manufacture of the tapered element, consequently, the element has a core of varying density from one end to the other, with the denser portion near the thinner end of the element. Due to this increased density, that end of the element is relatively rigid, even though quite thin, and although the core material is less dense in the thick end, owing to the greater quantity of material present the rigidity is not substantially reduced.

In Fig. 15 there is shown a development of a portion of a roll 62 having a projection 65 which enters one of the cavities 64 in a drum 63. This view illustrates the manner in which the projection 65 forces the web into contact with the bottom of the cavity.

In Fig. 17 there is illustrated on an enlarged scale a portion of the cooperating rotary drums illustrating the manner in which the cutting edges 66 at the edges of the cavities pinch and sever the webs 61. Owing to the pressure applied by the cutting edges and the manner in which the article is produced, the webs are severed at the extreme edges of the element and thus in the operation of the apparatus the molding cylinders consolidate, mold, and trim the article.

The operation of the cooperating mold cavities is illustrated in Figs. 18 and 19, where it will be seen that in Fig. 19 the space 69 occupied by the webs and the plastic material is relatively long and narrow, while at the point illustrated in Fig. 18, the space 70 is somewhat shorter than the space 69 but of increased depth. If the webs used are of uniform width throughout their length it is evident that as the thickness of the core increases its transverse dimension must decrease in order that the webs may completely enclose the core, and the core material is subjected to what amounts to an extrusion operation, being forced upwardly out of the bight of the drums as these rotate through an extrusion orifice defined by the cavities of the drums, this orifice increasing from the thin end of the element to the thick end. The orifice is of constant perimeter at all times, but its dimensions vary, the length of the orifice decreasing as the width increases.

In Fig. 12 the apparatus is illustrated in section in a form suitable for the production of three shingles of different sizes from single webs. The webs are slit by the devices 43 into subdivisions designated 71, 72, and 73, and the cylinders 62 are provided with three series of projections 65, one series for each of the webs. Similarly, the cylinders 63 are provided with circumferential series of cavities 64, one series for each of the web subdivisions. By the apparatus illustrated, three individual shingles may be produced simultaneously at each operation of the apparatus.

In Fig. 14 there is shown a modified type of drum used in the production of the three unit strip shingle of the form shown in Fig. 10. In this arrangement the drum 63 is provided with mold cavities 64 having a length equal to the length of the finished shingle and each cavity is provided with projecting knife edges 74 corresponding in shape and position to the shape and position of the notches formed in the edge of the finished product and defining the tabs. In the production of this element the webs, as they pass between the drums 63, are acted on by the knife edges 74 so as to form slits 75, and the application of pressure to the webs and the material contained between them causes the edges of the webs at the slits to separate slightly as shown in Fig. 10. In the product illustrated in that figure, the element is of substantially uniform thickness from the edge 21 to the point 24 and the tabs are of increasing thickness. Since the webs are preferably of uniform width throughout, it is apparent that the increase in thickness of the tabs is accomplished by a decrease in the transverse dimension of the tabs. Consequently the notches 27 are of increasing width from their rear ends to their forward ends. Also, the peripheral measurement of the element at a point between the end 21 and the point 24 is equal to the sum of the peripheral measurements of the several tabs.

It will be apparent that with the new apparatus, building products of many different forms may be produced by using molding drums of appropriate form. Similarly, jacket webs and filling material of many different kinds may likewise be employed with this apparatus. The mechanism is of rugged construction and has only a few working parts so that it cannot get out of order easily, nor is it subject to rapid wear. While I have shown mechanism appropriate for the manufacture of roofing elements including a core made of asphalt and a solid material, it will be apparent that when other plastic substances are substituted for the asphalt, changes will be required in such parts of the apparatus as are used for the preparation of this core material, but the mixing, measuring, and other mechanisms required are all standard construction and the types to be selected will be readily apparent to anyone skilled in the art.

This application is a division of my application Ser. No. 139,612, filed October 5, 1926.

I claim:

1. Apparatus for making products suitable for building and other purposes, which comprises the combination of means for advancing a pair of webs lengthwise and in spaced relation, means for feeding plastic material into the space between the webs, and means for pressing the webs together against the plastic material between them, the pressing means, being also arranged to mold the plastic material to form a series of connected building products each having a selected shape of varying thickness and to press the webs into contact without overlapping along at least a pair of opposite edges of said connected products.

2. Apparatus for making products suitable for building and other purposes, which comprises the combination of means for advancing a pair of webs lengthwise and in spaced relation, means for feeding plastic material into the space between the webs, and means for pressing the webs against the plastic material between them, the pressing means being also arranged to mold the plastic material to a selected shape and to form the webs to enclose the plastic material along at least a pair of opposite sides of the shaped plastic mass, the said pressing means also including cutting devices operable to sever the webs along said sides of the mass.

3. Apparatus for making products suitable for building and other purposes, which comprises the combination of means for moving a pair of webs of jacket material lengthwise and in spaced relation, a receptacle for plastic material arranged to deliver the material to the space between the webs, and co-operating concave molding means operable to receive the webs with plastic material between them and to press the webs and plastic material to a selected shape.

4. Apparatus for making products suitable for building and other purposes which comprises the combination of means for moving a pair of webs of jacket material lengthwise and in spaced relation, a receptacle for plastic material arranged to deliver the material to the space between the webs, and cooperating rotary molding devices having registering concavities, said devices being arranged to receive the webs with plastic material between them in said concavities and to form the webs and material to a shape determined by said concavities.

5. Apparatus for making products suitable for building and other purposes, which comprises the combination of means for moving a pair of webs of jacket material lengthwise and in spaced relation, a receptacle for plastic material arranged to deliver the material to the space between the webs, and cooperating rotary molding devices having registering concavities, said devices being arranged to receive the webs with plastic material between them in said concavities and to form the webs and material to a shape determined by said concavities, the said means including cutting members cooperating to sever the webs along at least a part of the outline of the said shape.

6. Apparatus for making products suitable for building and other purposes, which comprises the combination of means for moving a pair of webs of jacket material lengthwise and in spaced relation, means for feeding plastic material into the space between the webs, and a pair of rotary members having cooperating mold surfaces arranged to act on the webs and the plastic material between them to form the webs and material into a succession of units of varying thickness, said webs being brought into contact without overlapping by said members along at least a pair of opposite sides of said units.

7. Apparatus for making products suitable for building and other purposes, which comprises the combination of means for moving a pair of webs of jacket material lengthwise and in spaced relation, a pair of rotary cylinders having mold cavities in their faces, means for pressing the webs into the said cavities, a receptacle for plastic material arranged to deliver this material to the spaces between the portions of the webs lying in the cavities, the cavities in the cylinders being arranged to cooperate in pairs to encase plastic material between portions of the webs lying in the cavities, and cooperating cutting devices carried by the cylinders arranged to sever the web along the outlines of the cavities.

8. Apparatus for making products suitable for building and other purposes, which comprises the combination of means for moving a pair of webs lengthwise, a pair of rotary cylinders having mold cavities in their faces, rotary means engaging each web and forcing portion thereof into the cavities in one of the cylinders, and means for feeding plastic material to the bight of the cylinders, this plastic material filling the portions of the webs which lie in the cavities, whereby, as the cylinders rotate, the cavities cooperate to consolidate and mold the plastic material between the webs.

9. Apparatus for making products suitable for building and other purposes, which comprises the combination of means for moving a pair of webs lengthwise, a pair of rotary cylinders having mold cavities in their faces, rotary means engaging each web and forcing portions thereof into the cavities in one of the cylinders, means for feeding plastic material to the bight of the cylinders, this plastic material filling the portions of the webs which lie in the cavities, whereby, as the cylinders rotate, the cavities cooperate to consolidate and mold the plastic material between the webs, and cutting edges formed on the cylinders around the cavities and arranged to sever the webs.

10. Apparatus form making product suitable for building and other purposes, which comprises the combination of means for moving a pair of webs continuously toward a selected point, coating devices for applying coating material to the outer surface of each web, a pair of rotary cylinders at the selected point, these cylinders having mold cavities in their faces, rotary means in advance of the said point for pressing each web into the cavities in one of the cylinders, a receptacle for plastic material arranged to deliver this material to the spaces between the webs, and cutting devices carried by the cylinders and outlining the cavities, these cavities and cutting devices being so arranged that as the cylinders rotate the webs are forced toward each other to encase the body of plastic material between them and the webs are thereafter severed along the edges of the encased body.

11. Apparatus for making products suitable for building and other purposes, which comprises the combination of means for moving a pair of webs toward a selected point, means for slitting the webs lengthwise in advance of this point, feeding means for introducing a plastic material between the adjacent surfaces of the slit webs, and means at the selected point for applying pressure to the webs to force the webs into close contact with the plastic material and also to consolidate and mold the latter to a selected shape.

12. Apparatus for making products suitable for building and other purposes, which comprises the combination of means for moving a pair of webs lengthwise, means for applying coating material, to the outer face of each web, means for introducing plastic material between the webs, and means acting on the webs to force them into contact with the said material and to consolidate and mold the material to a selected shape.

13. Apparatus for making products suitable for building and other purposes which comprises the combination of means for moving a pair of webs lengthwise and with their adjacent faces in contact, means for coating the outer face of each web, feeding means for introducing a quantity of plastic material between the webs, and molding means acting on the webs for pressing the webs against the plastic material and for consolidating and molding the said material and webs to a selected shape.

14. Apparatus for making products suitable for building and other purposes, which comprises the combination of means for moving a pair of webs lengthwise, coating devices for applying material to the outer faces of the webs, feeding means for introducing plastic material between the webs, a molding device operating on the webs to force the latter into contact with the plastic material and to consolidate and mold the material and the webs to a selected shape, and cutting means for severing the webs along the outline of the said shape.

15. Apparatus for making products suitable for building and other purposes which comprises the combination of means for moving a pair of webs of jacket material lengthwise, feeding means for introducing plastic material between the webs, and molding means acting on the webs with the plastic material between them to consolidate and mold the jacketed material into a succession of similar units of varying thickness from end to end thereof, said molding means acting with varying pressure on the material within the outline of each unit whereby the density of the material therein varies.

16. Apparatus for making products suitable for building and other purposes which comprises the combination of means for moving a pair of webs of jacket material lengthwise, feeding means for introducing plastic material between the webs, and co-operating pressure devices operable to act on the webs with the plastic material between them to consolidate and mold the jacketed material into a plurality of similar units, each of generally plate-like form, said plate having a tapering thickness from one end to the other.

17. Apparatus for making products suitable for building and other purposes which comprises the combination of means for moving a pair of webs of jacket material lengthwise, feeding means for introducing plastic material between the webs, and co-operating rotary pressure devices operable to act on the moving webs with the plastic material between them to consolidate and mold the jacketed material to the form of a plate, having a tapering thickness from one end to the other, the devices in their rotation forming the thin end of the plate before the thick end is formed.

18. In apparatus for making products suitable for building and other purposes, the combination of a pair of rolls, co-operating mold surfaces on the faces of the rolls, said surfaces being shaped to mold a formless mass into a succession of products of generally plate-like form but of tapering thickness and co-operating cutting means of the scoring type on the rolls extending along at least a part of the edges of said surfaces.

19. In apparatus for making products suitable for building and other purposes, the combination of a pair of rolls, each having registering portions adapted to shape a formless mass into a succession of plate-like products having a tapering thickness and co-operating cutting means of the scoring type on the rolls defining at least a part of the said portions.

20. In apparatus for making products suitable for building and other purposes, the combination of a pair of rolls, each having registering surfaces operable to mold material between the rolls to a shape defind by said surfaces, these surfaces co-operating to mold a shapeless mass to the form of plates thicker at one end than at the other, with the thin ends of the plates formed first as the rolls are rotated, and means for feeding plastic material to the bight of the rolls.

21. Apparatus for making products suitable for building and other purposes, which comprises the combination of means for advancing a pair of webs lengthwise and in spaced relation, means for feeding plastic material into the space between the webs, and means for pressing the webs toward each other to mold the webs and the plastic material between them into a series of similar connected units of a selected shape and to force the webs into contact without overlap along at least a pair of opposite sides of said units.

22. Apparatus for making products suitable for building and other purposes, which comprises the combination of means for advancing a pair of webs lengthwise and in spaced relation, means for feeding plastic material into the space between the webs, means acting on the webs and plastic material between them to mold the webs and material into a series of similar units, each having a selected shape, and means for severing the webs along at least a pair of sides of said shape and in a direction generally transverse of said webs.

23. Apparatus for making products suitable for building and other purposes, which comprises the combination of means for feeding plastic material between a pair of spaced webs, means for forcing the webs toward each other against said material and molding the webs and material to form a series of units, each having a selected shape, and means for forcing the webs into contact without overlap along at least a pair of opposite sides of said shape.

24. Apparatus for making products suitable for building and other purposes, which comprises the combination of means for feeding plastic material between a pair of spaced webs, and a pair of rotary members acting on the webs and the plastic material between them, said members having cooperating mold surfaces adapted to shape the webs and material into a series of similar units of plate form having a tapering thickness from end to end thereof.

25. Apparatus for making products suitable for building and other purposes, which comprises the combination of means for feeding plastic material between a pair of spaced webs, and a pair of rotary members acting on the webs and the plastic material between them, said members having cooperating mold surfaces adapted to shape the webs and material into a series of similar units of plate form having a tapering thickness from end to end thereof and to force the webs into contact without overlap along at least a pair of opposite sides of each unit.

In testimony whereof I affix my signature.

THOMAS ROBINSON.